United States Patent
Kim

[11] Patent Number: 5,943,513
[45] Date of Patent: Aug. 24, 1999

[54] ZOOMING METHOD AND APPARATUS FOR A CAMERA

[75] Inventor: Seong-Gon Kim, Kyeongsangnam-do, Rep. of Korea

[73] Assignee: Samsung Aerospace Industries, Inc., Kyeongsangham-do, Rep. of Korea

[21] Appl. No.: 08/993,572

[22] Filed: Dec. 18, 1997

[30] Foreign Application Priority Data

Dec. 23, 1996 [KR] Rep. of Korea ............. 96-70217

[51] Int. Cl.⁶ .................................................. G03B 17/00
[52] U.S. Cl. ................................................ 396/82; 396/81
[58] Field of Search ......................... 396/72, 79, 80, 396/81, 82

[56] References Cited

U.S. PATENT DOCUMENTS

| | | | |
|---|---|---|---|
| 4,914,464 | 4/1990 | Azuma et al. | 396/81 |
| 4,920,369 | 4/1990 | Kaneda et al. | 396/81 |
| 4,924,253 | 5/1990 | Imai et al. | 396/81 |
| 5,038,163 | 8/1991 | Hirasawa | 396/81 |
| 5,280,317 | 1/1994 | Haraguchi et al. | |
| 5,448,413 | 9/1995 | Kobayashi et al. | 396/82 |
| 5,497,209 | 3/1996 | Iwane | 396/81 |
| 5,790,902 | 8/1998 | Mizouchi et al. | 396/79 |

*Primary Examiner*—Russell Adams
*Attorney, Agent, or Firm*—Finnegan, Henderson, Farabow, Garrett & Dunner, L.L.P.

[57] ABSTRACT

Zooming systems consistent with the present invention are used with a camera having a zoom lens barrel which moves in at least two zoom directions. The zooming system comprises a switch for selecting a zooming operation of the camera. An encoder detects a zoom position of the zoom lens barrel and generates a zoom position signal representing the detected zoom position. A memory stores focus error data for each zoom position and for each zoom direction at each zoom position. A zoom motor driver drives a zoom motor which moves the zoom lens barrel in the zoom directions. Finally, a controller controls the camera by: driving the zoom motor in a motor direction while the switch means is turned on; driving the zoom motor for a predetermined period of time in the motor direction after the switch is turned off; and calculating an auto focus correction value based on the detected zoom position and the focus error data corresponding to the detected zoom position.

10 Claims, 6 Drawing Sheets

| ENCODE | POS | ZOOM POSITION | W → T ZOOMING | T → W ZOOMING |
|--------|-----|---------------|---------------|---------------|
| 0000 | 0 | CLOSE | | |
| 0001 | 1 | | | |
| 0010 | 2 | $f_0$ | | |
| 0011 | 3 | $f_1$ | | |
| • | • | • | | |
| • | • | • | | |
| • | • | • | | |
| n | n | $f_n$ | | |

□ : Start Position
○ : Stop Position
— : Control Signal
— : Over-Running Time After Receving a Encoder Signal

| ZP 3210 | POS | i | ii | iii | iiii |
|---------|-----|------|----------|--------------|------|
| 1110    | 0   | LOCK |          |              |      |
| 1010    | 1   |      |          |              |      |
| 1011    | 2   | $f_0$ |         |              |      |
| 1001    | 3   | $f_1$ |         |              |      |
| 0001    | 4   | $f_2$ |         |              |      |
| 0011    | 5   | $f_3$ |         |              |      |
| 0010    | 6   | $f_4$ |         |              |      |
| 0110    | 7   | $f_5$ |         | STOP ON STOP |      |
| 0111    | 8   | $f_6$ |         |              |      |
| 0101    | 9   | $f_7$ |         |              |      |
| 0100    | A   | $f_{7'}$ |      |              |      |
| 1100    | B   |      |          |              |      |
| 1101    | C   | MACRO |         |              |      |

▫ —— ZOOM START POSITION
○ —— ZOOM STOP POSITION

ZOOMING METHOD AND APPARATUS FOR A CAMERA

BACKGROUND OF THE INVENTION

A. Field of the Invention

The present invention relates to a zooming method and apparatus for a camera. More particularly, the present invention relates to a zooming apparatus and method for reducing backlash and focus error during a zooming operation.

B. Description of the Related Art

A variety of cameras having a zooming system include a zooming switch. The zooming switch further includes a telephoto angle switch and a wide angle switch which are operated by a user to move a zoom lens barrel during zooming. The telephoto angle switch operates the camera to zoom from a wide angle position to a telephoto angle position. The wide angle switch operates the camera to zoom from a telephoto angle position to a wide angle position.

During operation, the telephoto angle switch and the wide angle switch output a signal to a motor drive unit which drives the zoom lens barrel. An encoder then detects movement of the zoom lens barrel and generates a zoom position signal. Each zoom position is a discrete position that corresponds to a predetermined focal length. These zoom positions may be, for example, 38 mm, 45 mm, 55 mm, 60 mm, 65 mm, 75 mm, 80 mm, 90 mm, 100 mm, 105 mm, and 115 mm.

Thus, when a user stops the operation of the zooming switch, the zoom position stops at one of the above discrete zoom positions according to a zoom position signal received from the encoder. However, the movement of the zoom lens barrel will be different when zooming from a telephoto angle position to a wide angle position as compared to that when zooming from a wide angle position to a telephoto angle position. The difference in the movement of the zoom lens barrel is due to a backlash caused by the gears of the motor driving the zoom lens barrel and may, as a result, cause a focus error. A focus error may also occur due to inaccuracies of the encoder pattern. Therefore, the focal length (i.e. 90 mm) will be different when zooming, for example, from 80 mm to 90 mm as compared to when zooming from 100 mm to 90 mm.

A prior art driving method is disclosed in U.S. Pat. No. 5,280,317. The '317 patent discloses that when a telephoto angle switch is activated, the driving system drives a zoom motor in a forward direction and continues to do so even after the telephoto angle switch is deactivated. The driving system stops driving the zoom motor only after a predetermined period of time has elapsed. Similarly, when a wide angle switch is activated, the driving system drives a zoom motor in a backward direction and continues to do so until a predetermined period of time has elapsed after the wide angle switch has been deactivated. The driving system then drives the zoom motor in a forward direction until an encoder signal of a destination zoom position is received. FIG. 5 is a diagram illustrating the zooming operation from a telephoto angle position to a wide angle position using the system disclosed by the '317 patent.

For example, when zooming from the 100 mm zoom position to the 80 mm zoom position, the driving system drives the zoom motor in a backward direction from the 100 mm position to the 75 mm position in order to read from the encoder a border between the 80 mm and 75 mm positions. The driving system then reverses the zoom motor in a forward direction to move the zoom lens barrel to the 80 mm zoom position. FIG. 6 is a table illustrating the zoom start and stop positions corresponding to a plurality of focal lengths of the prior art zooming system.

The method of the '317, however, suffers from the fact that it cannot eliminate a focus error due to the inaccuracies of the encoder pattern. A second problem is that the driving of the motor in both the forward and backward directions when changing zoom positions causes visual discomfort on the user. Therefore, there is a need for a user-friendly zooming system which can eliminate the inaccuracies of the encoder pattern.

SUMMARY OF THE INVENTION

Zooming systems and methods consistent with the present invention reduce focal errors and eliminate the mechanical backlash that occurs during a zooming operation.

To achieve these and other advantages, zooming systems consistent with the present invention are used with a camera having a zoom lens barrel which moves in at least two zoom directions. The zooming system comprises a switch means for selecting a zooming operation of the camera. An encoder means detects a zoom position of the zoom lens barrel and generates a zoom position signal representing the detected zoom position. A memory stores focus error data for each zoom position and for each zoom direction at each zoom position. A zoom motor driver drives a zoom motor which moves the zoom lens barrel in the zoom directions. Finally, a control means controls the camera and includes means for driving the zoom motor in a motor direction while the switch means is turned on, means for driving the zoom motor for a predetermined period of time in the motor direction after the switch means is turned off, and means for calculating an auto focus correction value based on the detected zoom position and the focus error data corresponding to the detected zoom position.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION

The present invention will be described in detail with reference to the accompanying drawings.

Figures 1, 3:
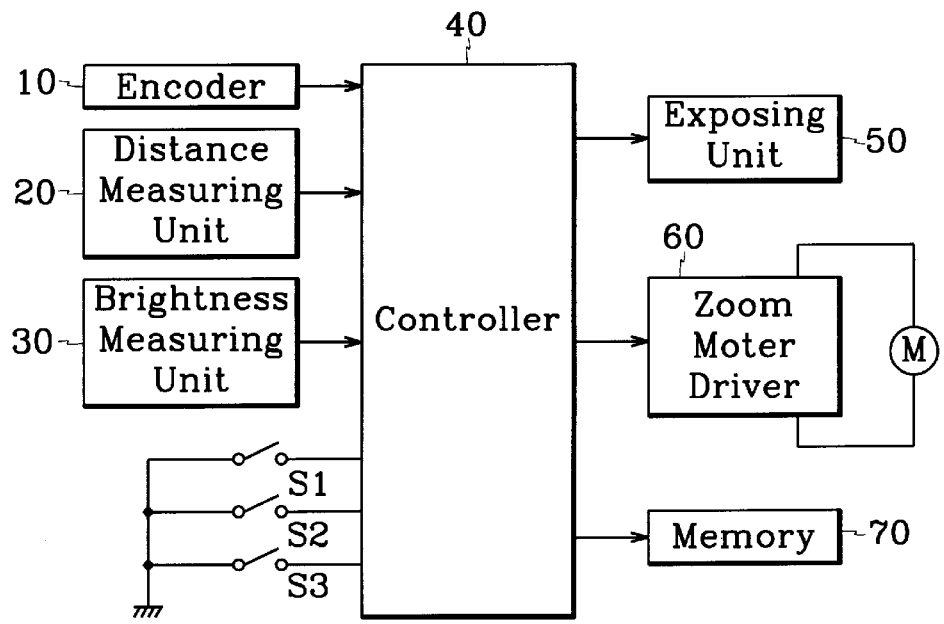
FIG. 1 is a block diagram of a zooming system consistent with the present invention.
FIG. 3 is a table illustrating zoom start and stop positions corresponding to a plurality of predetermined focal lengths.

FIG. 1 illustrates a zooming system consistent with the present invention. As shown in FIG. 1, the zooming system comprises a release switch S1, a wide angle switch S2, a telephoto angle switch S3, an encoder 10, a distance measuring unit 20, a brightness measuring unit 30, a controller 40, an exposing unit 50, a zoom motor driver 60 having a zoom motor M, and a memory 70.

Encoder 10 detects the zoom position of a zoom lens barrel (not shown).

Distance measuring unit 20 measures a distance to an object and brightness measuring unit 30 measures the brightness around the object. Controller 40 generates a plurality of control signals for controlling exposing unit 50, zoom motor driver 60, and memory 70. Memory 70 stores focus error data for each zoom position and zoom direction of the zoom lens barrel.

The focus error data stored in memory 70 is used to correct a focus error. The focus error data is stored in memory 70 during a manufacturing process and is retrieved during usage of the camera. During the manufacturing process, an autocollimator (not shown) measures two focal lengths at each zoom position. The first focal length corresponds to the case when the zoom lens barrel moves to the respective zoom position from a relative telephoto angle position. This is referred to as the focal length for when the zoom lens barrel moves in a wide angle direction, the direction for moving from a telephoto position to a wide angle position. The second focal length corresponds to the case when the zoom lens barrel moves to the respective zoom position from a relative wide angle position. This is referred to as the focal length for when the zoom lens barrel moves in a telephoto angle direction, the direction for moving from a wide angle position to a telephoto angle position. The autocollimator then outputs to a correction controller (not shown) the detected focal lengths for each zoom position and zoom direction.

The correction controller calculates a focus error data value corresponding to the amount the focal length detected by the autocollimator is different from the predetermined focal length for the respective zoom position. The correction controller then stores in memory 70 the focus error data. In addition, for each zoom position, the correction controller calculates two focus error data values which correspond to the two zoom directions (i.e., the wide angle direction and the telephoto angle direction). The two error data values will be different due to the mechanical backlash of the zoom motor M and a space between adjacent zoom positions of the encoder.

Figure 4:
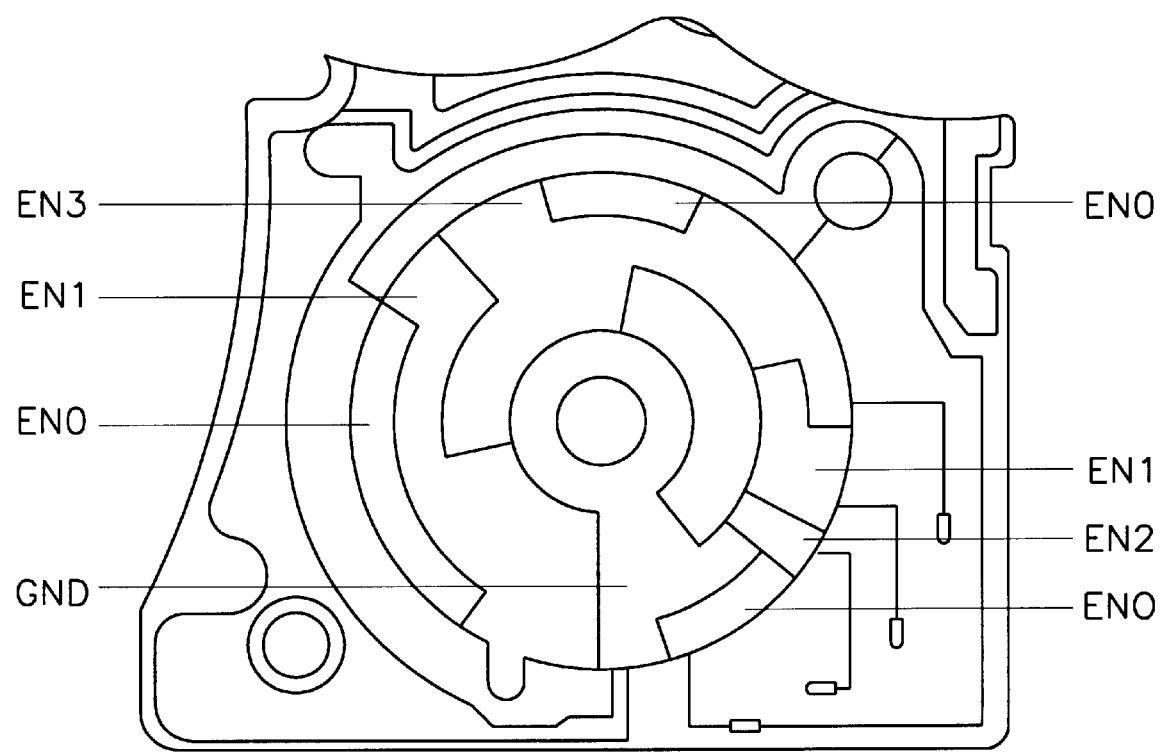
FIG. 4 is a diagram of an encoder pattern of an encoder consistent with the present invention.
Figures 5, 6:
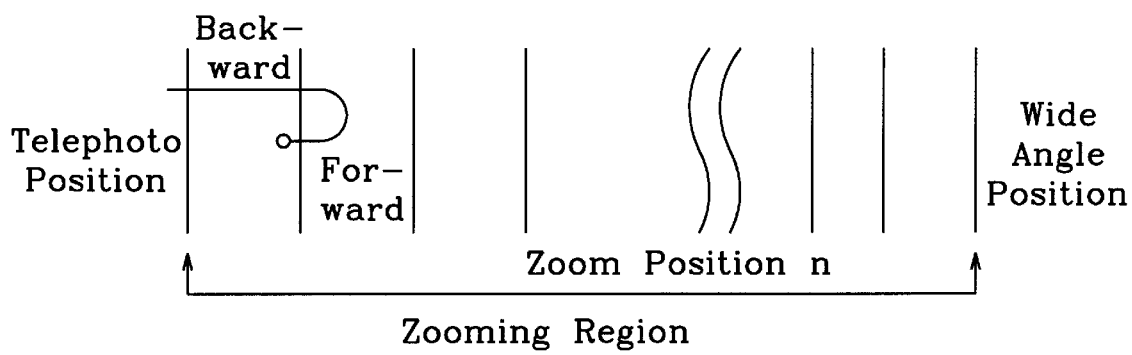
FIG. 5 is a diagram illustrating zooming operation from a telephoto angle position to a wide angle position for a prior art zooming system.
FIG. 6 is a table illustrating zoom start and stop positions corresponding to a plurality of focal lengths of the prior art zooming system of FIG. 5.

FIG. 4 is an illustration of encoder 10 used in systems consistent with the present invention. As shown in FIG. 4, encoder 10 includes four conductive regions EN0–EN3. Each conductive region EN0–EN3 contacts one of four terminals corresponding to four brushes (not shown). When a terminal is in contact with a conductive region, encoder 10 produces a "0" signal. Otherwise, encoder 10 produces a "1" signal. The zoom code data "1" and "0" from the brushes represents the zoom position and is shown in the first column of the table of FIG. 3.

Figure 2A:
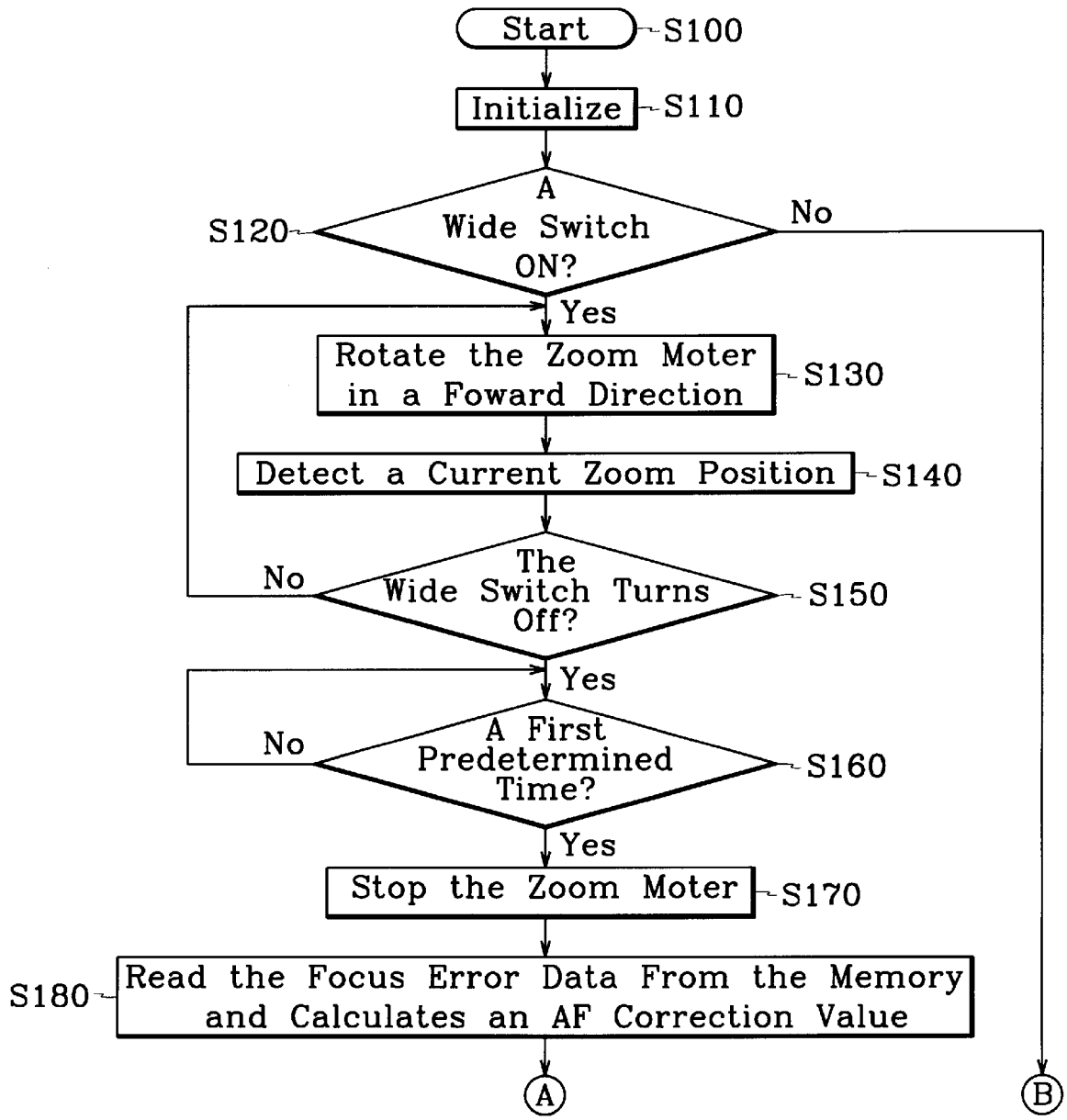
FIGS. 2A–2C are flow diagrams showing a method for operating the zooming system of FIG. 1.

The operation of the zooming system for a camera consistent with the present invention will now be explained with reference to FIGS. 2A–2C. When the camera is turned on and a user operates wide angle switch S2 (steps 100 to 120), controller 40 outputs a wide angle signal to drive zoom motor driver 60 (step 130). In response, zoom motor driver 60 rotates the zoom motor M in a forward direction to move the zoom lens barrel in the wide angle direction. Encoder 10 detects the corresponding focal length according to the movement of the zoom lens barrel and outputs to controller 40 a zoom position signal corresponding to the detected focal length (step 140).

When the operation of wide angle switch S2 is deactivated, controller 40 outputs a control signal to further drive the zoom motor M in a forward direction for a first predetermined period of time starting from the time at which controller 40 receives the encoder signal representing a destination border (steps 150 to 170). Zoom motor driver 60 drives the zoom motor M during the first predetermined period of time even after the wide switch S2 is turned off in order to eliminate a backlash or repulsion caused by the gears of the zoom motor M and a focus error caused by a space between adjacent zoom positions of the encoder. For example, when zooming from 100 mm position to 80 mm position, zoom motor driver 60 drives the zoom motor M until the signal output by encoder 10 represents a border between the 90 mm position and the 80 mm position. Driver 60 then drives the zoom motor M for the first predetermined period of time starting from the time at which controller 40 receives the encoder signal representing the border between 90 mm position and 80 mm zoom positions.

Controller 40 next determines a focal length in response to the encoder signal and reads from memory 70 the focus error data corresponding to the current zoom position and zoom direction (step 180). Based on the focus error data read from the memory 70 and the focal length received from encoder 10, controller 40 calculates an auto focus (AF) correction value.

Figure 2B:
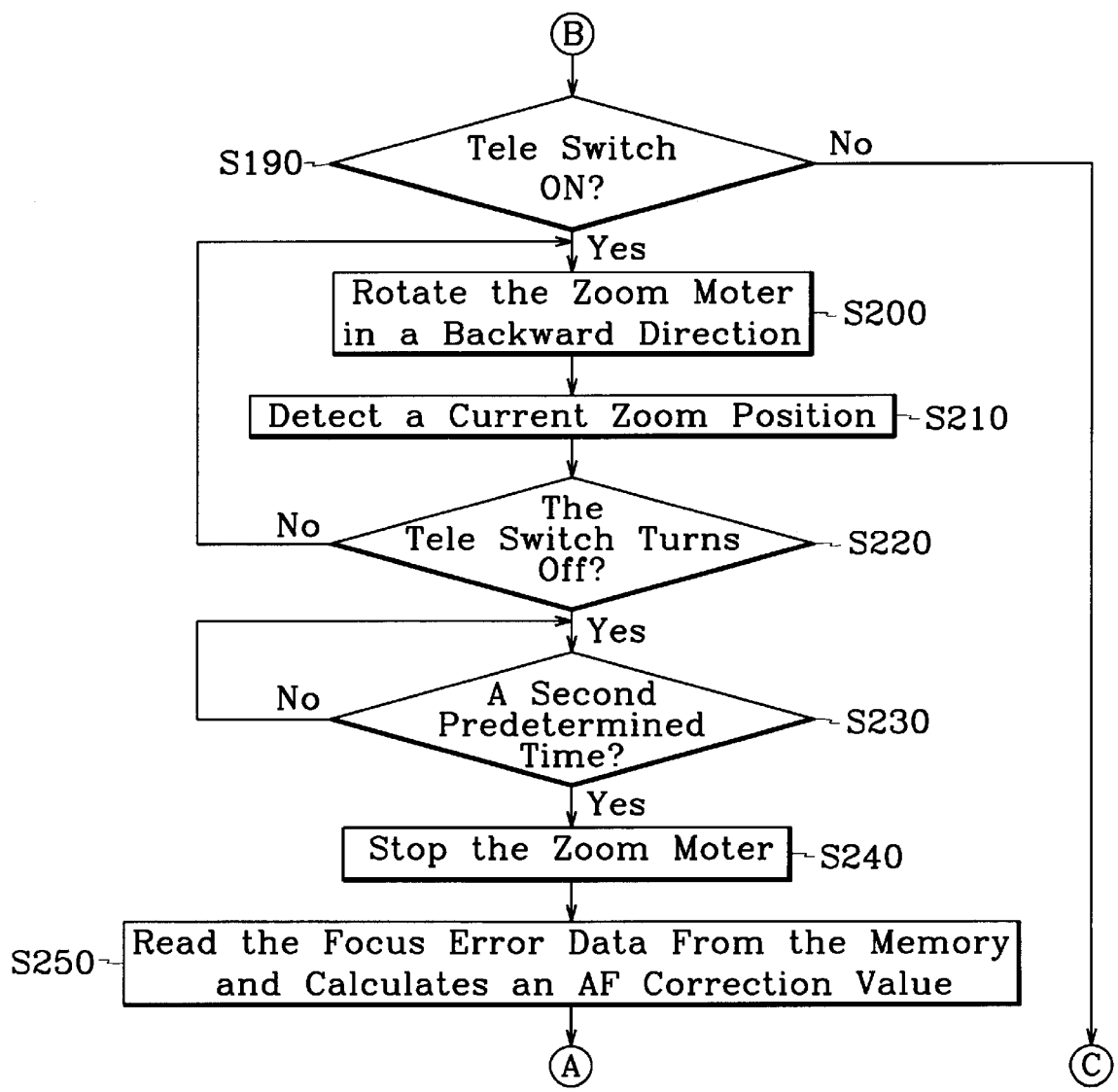
Figure 2C:
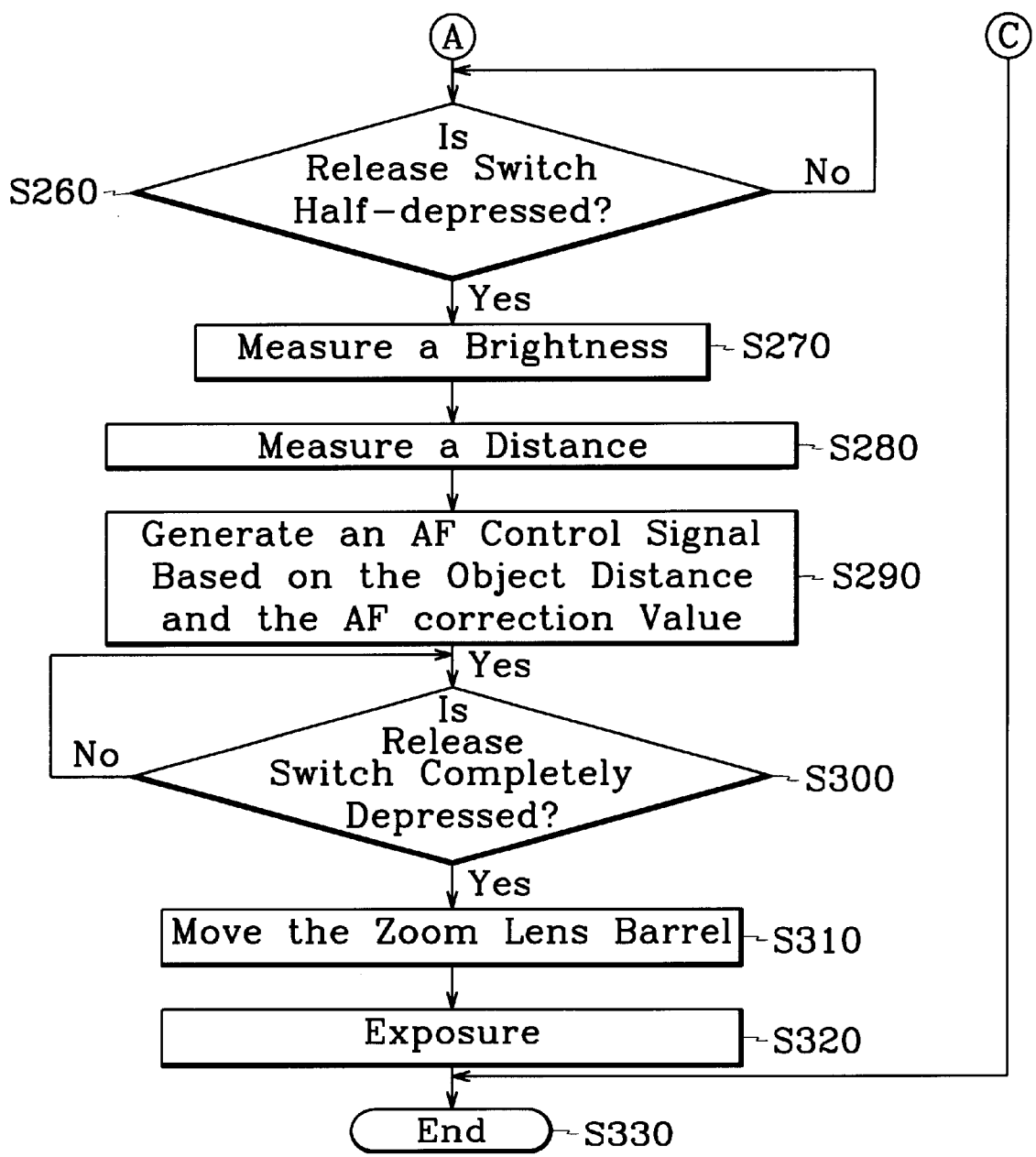

The control flow then proceeds to step 260, as shown in FIG. 2C. When release switch S1 is halfway depressed, controller 40 generates control signals causing distance measuring unit 20 to measure a distance to the object and brightness measuring unit 30 to measure a brightness around the object (steps 260 to 280). Controller 40 then generates an AF control signal based on a distance signal received from distance measuring unit 20 and the AF correction value calculated at step 180 (step 290). When release switch S1 is completely depressed, the zoom lens barrel is positioned in response to the AF control signal (steps 300 to 310). Exposure unit 50 then exposes the object, and the control flow ends (step 320 to 330).

When the user operates telephoto angle switch S3, as opposed to wide angle switch S2, the control flow proceeds to step 190 of FIG. 2B. Controller 40 then outputs a telephoto angle signal to zoom motor driver 60 (step 200). In response, zoom motor driver 60 rotates the zoom motor M in a backward direction to move the zoom lens barrel in the telephoto angle direction. Encoder 10 detects the corresponding focal length according to the movement of the zoom lens barrel and outputs to controller 40 a zoom position signal corresponding to the detected focal length (step 210).

When the telephoto angle switch S3 is turned off, controller 40 outputs a control signal to zoom motor driver 60 to further rotate the zoom motor M in the backward direction until a second predetermined period of time has terminated (steps 220 to 230). Zoom motor driver 60 drives the zoom motor M during the second predetermined period of time starting from the time at which controller 40 receives the encoder signal representing a destination border, even after the telephoto angle switch S3 is turned off in order to eliminate a backlash or repulsion caused by the gears of the zoom motor M and a focus error caused by a space between adjacent zoom positions of the encoder.

After the second predetermined period of time has terminated, controller 40 controls zoom motor driver 60 to stop the drive motor M (step 240). Controller 40 then determines a focal length in response to the encoder signal and reads from memory 70 the focus error data corresponding to the current zoom position and zoom direction (step 250). In addition, controller 40 calculates an auto focus (AF) correction value based on the focus error data read from the memory 70 and the focal length received from encoder 10. The control flow then proceeds to step 260 of FIG. 2 and control continues in accordance with the method described with respect to FIG. 2C.

FIG. 3 is a table illustrating a zooming operation consistent with the present invention. The first column of the table represents zoom code data corresponding to the encoding signal output from encoder 10. The second column of the table represents a zoom position number corresponding to the zoom code data. The third column of the table represents a focal length for each zoom position. The fourth column of the table illustrates a zooming operation in the telephoto angle direction while the fifth column illustrates a zooming operation in the wide angle direction. That is, when zooming in from position 0 to position 2, the zoom lens barrel is moved to the border between position 1 and position 2, and then further moved during the first predetermined period of time t1. On the other hand, when zooming in from position 2 to position 0, the zoom lens barrel is moved to the border between position 1 and position 0, and then further moved during the second predetermined period of time t2. Values for the first and second predetermined periods of time are dependent upon characteristics of the zoom motor M and a space between adjacent zoom positions of the encoder and are the minimum amounts of time required to eliminate the mechanical backlash.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A zooming system for a camera having a zoom lens barrel which moves in at least two zoom directions to a plurality of zoom positions, the system comprising:

switch means for selecting a zooming operation of the camera;

detection means for detecting a zoom position of the zoom lens barrel and for generating a zoom position signal representing the detected zoom position;

a memory for storing focus error data for each zoom position and for each zoom direction at each zoom position;

a zoom motor driver for driving a zoom motor which moves the zoom lens barrel in the zoom directions; and control means for controlling the camera and comprising:

means for driving the zoom motor in a motor direction while the switch means is turned on;

means for driving the zoom motor for a predetermined period of time in the motor direction after the switch means is turned off; and means for calculating an auto focus correction value based on the detected zoom position and the focus error data corresponding to the detected zoom position.

2. The system of claim 1, wherein the focus error data further comprises:

data for each zoom position for when zooming in a wide angle direction and for when zooming in a telephoto angle direction; and wherein the wide angle direction is the direction the zoom lens barrel moves in when zooming from a telephoto angle position to a wide angle position, and wherein the telephoto angle direction is the direction the zoom lens barrel moves in when zooming from a wide angle position to a telephoto angle position.

3. The system of claim 1, further comprises:

a distance measuring means for measuring a distance to an object and for outputting to the control means a distance signal corresponding to the measured distance; and wherein the control means generates an auto focus control signal based on the distance signal received from the distance measuring means and the auto focus correction value.

4. The system of claim 2, further comprises:

a distance measuring means for measuring a distance to an object and for outputting to the control means a distance signal corresponding to the measured distance; and wherein the control means generates an auto focus control signal based on the distance signal received from the distance measuring means and the auto focus correction value.

5. The system of claim 2, wherein the switch means comprises:

a telephoto angle switch for zooming in the telephoto angle direction; and a wide angle switch for zooming in the wide angle direction.

6. The system of claim 5, wherein the control means further comprises:

means for driving the zoom motor in the wide angle direction while the wide angle switch is turned on; and means for driving the zoom motor for a first predetermined period of time in the wide angle direction after the wide angle switch is turned off.

7. The system of claim 5, wherein the control means further comprises:

means for driving the zoom motor in the telephoto angle direction while the telephoto angle switch is turned on; and means for driving the zoom motor for a second predetermined period of time in the telephoto angle direction after the telephoto angle switch is turned off.

8. A zooming method for a camera having a zooming switch, a zoom motor for driving a zoom lens barrel in at least two zoom directions to a plurality of zoom positions, and a memory for storing focus error data for each zoom position and for each zoom direction at each zoom position, the method comprising the steps of:

turning the zooming switch on;

driving the zoom motor in a motor direction while the zooming switch is turned on to move the zoom lens barrel in a first zoom direction;

driving a zoom motor for a predetermined period of time in the motor direction after the zooming direction is turned off;

detecting a zoom position and generating a zoom position signal;

reading from the memory the focus error data corresponding to the detected zoom position and the first zoom direction; and calculating an auto focus correction value based on the focus error data and the detected zoom position.

9. The method of claim 8, further comprising the steps of:

measuring a distance to an object; and generating an auto focus control signal based on the measured distance and the auto focus correction value.

10. A method for manufacturing a camera zooming system having a zoom lens barrel and a memory, the method comprising the steps of:

detecting a focal length at a plurality of zoom positions when the zoom lens barrel moves in a first zoom direction from a wide angle position to a telephoto angle position;

detecting a focal length at the plurality of zoom positions when the zoom lens barrel moves in a second zoom direction from a telephoto angle position to a wide angle position;

outputting the detected focal lengths for each of the plurality of zoom positions and for the first and second zoom directions;

calculating difference values respectively representing a difference between the detected focal length and a predetermined focal length of each zoom position; and storing focus error data according to the calculated difference values for each zoom position and for each zoom direction at each zoom position.

* * * * *